United States Patent
Shen (10) Patent No.: US 10,909,703 B2
(45) Date of Patent: Feb. 2, 2021

(54) IMAGE PROCESSING METHOD, ELECTRONIC DEVICE AND COMPUTER-READABLE STORAGE MEDIUM

(71) Applicant: BOE TECHNOLOGY GROUP CO., LTD., Beijing (CN)

(72) Inventor: Yan Shen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/394,282

(22) Filed: Apr. 25, 2019

(65) Prior Publication Data

US 2020/0058130 A1 Feb. 20, 2020

(30) Foreign Application Priority Data

Aug. 14, 2018 (CN) .......................... 2018 1 0924381

(51) Int. Cl.
  *G06T 7/55* (2017.01)
  *H04N 5/232* (2006.01)
  *H04N 5/262* (2006.01)

(52) U.S. Cl.
  CPC ........... *G06T 7/55* (2017.01); *H04N 5/23238* (2013.01); *H04N 5/2628* (2013.01); *G06T 2207/20221* (2013.01)

(58) Field of Classification Search
  CPC ............ G06T 7/55; G06T 2207/20221; H04N 5/23238; H04N 5/2628
  See application file for complete search history.

(56) References Cited

U.S. PATENT DOCUMENTS 7,719,568 B2 * 5/2010 Hung .................... G06T 3/0062
  348/143
8,145,004 B2 * 3/2012 Camp, Jr. ............. G06T 3/4053
  382/254

(Continued)

FOREIGN PATENT DOCUMENTS

CN  103366339 A  10/2013
CN  105096329 A  11/2015

(Continued)

OTHER PUBLICATIONS

First Office Action for CN Appl. No. 201810924381.0, dated Apr. 9, 2020.

*Primary Examiner* — Dave Czekaj
*Assistant Examiner* — Shanika M Brumfield
(74) *Attorney, Agent, or Firm* — The Webb Law Firm (57) ABSTRACT

The present disclosure relates to an image processing method, an electronic device and a computer-readable storage medium. A method comprises: acquiring a wide-angle image and a non-wide-angle image acquired by a wide-angle acquisition apparatus and a non-wide-angle acquisition apparatus respectively, a view finding range of the wide-angle image including that of a non-wide-angle image; performing image matching between the wide-angle image and the non-wide-angle image to identify a first sub-image in the wide-angle image corresponding to the non-wide-angle image; cutting out edge images from the wide-angle image, which comprise at least a first edge sub-image and a second edge sub-image at two opposite sides of the first sub-image; stitching the edge images and the non-wide-angle image to obtain a stitched image, wherein the first edge sub-image and the second edge sub-image are stitched to corresponding sides of the non-wide-angle image, respectively; and outputting the stitched image for display.

8 Claims, 7 Drawing Sheets

(56) References Cited

U.S. PATENT DOCUMENTS

| | | | |
|---|---|---|---|
| 8,482,638 B2* | 7/2013 | Shiohara | H04N 5/23212 348/240.3 |
| 8,780,200 B2* | 7/2014 | Yamamoto | H04N 5/23293 348/143 |
| 2003/0043210 A1* | 3/2003 | Hanks | G06T 3/4053 715/838 |
| 2004/0017386 A1* | 1/2004 | Liu | G08B 13/19643 345/647 |
| 2006/0056056 A1* | 3/2006 | Ahiska | G08B 13/19608 359/690 |
| 2006/0188173 A1* | 8/2006 | Zhang | H04N 7/0122 382/276 |
| 2007/0211934 A1* | 9/2007 | Pan | G06K 9/32 382/154 |
| 2007/0236595 A1* | 10/2007 | Pan | G06T 3/0018 348/335 |
| 2008/0030592 A1* | 2/2008 | Border | H04N 5/232 348/218.1 |
| 2010/0060665 A1* | 3/2010 | Wang | G09G 5/391 345/660 |
| 2011/0228043 A1* | 9/2011 | Masuda | H04N 13/296 348/36 |
| 2012/0075489 A1* | 3/2012 | Nishihara | H04N 5/23296 348/222.1 |
| 2013/0100255 A1* | 4/2013 | Ohba | G06T 3/4038 348/47 |
| 2013/0300742 A1* | 11/2013 | Ikeda | G06T 5/00 345/428 |
| 2017/0230585 A1* | 8/2017 | Nash | H04N 5/2258 |
| 2018/0352165 A1* | 12/2018 | Zhen | G06T 5/50 |
| 2019/0026862 A1* | 1/2019 | Chang | G06F 3/04817 |
| 2019/0166307 A1* | 5/2019 | Murao | H04N 5/23227 |

FOREIGN PATENT DOCUMENTS

| | | |
|---|---|---|
| CN | 105957007 A | 9/2016 |
| CN | 106274684 A | 1/2017 |
| CN | 107948505 A | 4/2018 |

* cited by examiner

IMAGE PROCESSING METHOD, ELECTRONIC DEVICE AND COMPUTER-READABLE STORAGE MEDIUM

CROSS-REFERENCE TO RELATED APPLICATIONS

The present application claims priority to Chinese Patent Application No. 201810924381.0 filed on Aug. 14, 2018, the disclosure of which is incorporated by reference herein in its entirety.

TECHNICAL FIELD

The present application relates to a technical field of image processing, specifically, to an image processing method, an electronic device and a computer-readable storage medium.

SUMMARY

According to one aspect of the present disclosure, there is provided a method comprising: acquiring a wide-angle image and a non-wide-angle image acquired by a wide-angle acquisition apparatus and a non-wide-angle acquisition apparatus respectively, a view finding range of the wide-angle image including a view finding range of the non-wide-angle image; performing image matching between the wide-angle image and the non-wide-angle image to identify a first sub-image in the wide-angle image corresponding to the non-wide-angle image; based on the image matching between the wide-angle image and the non-wide-angle image, cutting out edge images from the wide-angle image, the edge images including at least a first edge sub-image and a second edge sub-image at two opposite sides of the first sub-image; stitching the edge images and the non-wide-angle image to obtain a stitched image, wherein the first edge sub-image and the second edge sub-image are stitched to corresponding sides of the non-wide-angle image, respectively; and outputting the stitched image for display.

In some embodiments, the wide-angle image and the non-wide-angle image are respectively acquired by the wide-angle acquisition apparatus and the non-wide-angle acquisition apparatus on the same vertical line.

In some embodiments, the wide-angle image and the non-wide-angle image are acquired at the same time.

In some embodiments, the method further comprises: before performing image matching between the wide-angle image and the non-wide-angle image to identify the first sub-image in the wide-angle image corresponding to the non-wide-angle image, performing distortion correction on the acquired wide-angle image.

In some embodiments, the first edge sub-image and the second edge sub-image partially overlap with the first sub-image, respectively.

In some embodiments, the method further comprises: before outputting the stitched image for display, determining whether an aspect ratio of the stitched image suits an aspect ratio of a display screen, in response to determining that the aspect ratio of the stitched image suits the aspect ratio of the display screen, directly outputting the stitched image; and in response to determining that the aspect ratio of the stitched image does not suit the aspect ratio of the display screen, cutting the stitched image, and outputting the stitched image after cutting, wherein the aspect ratio of the stitched image after cutting suits the aspect ratio of the display screen.

In some embodiments, cutting the stitched image comprises: cutting edge parts of the stitched image, so that the center of a part corresponding to the first sub-image being used as the center of the stitched image after cutting.

In some embodiments, in response to determining that the aspect ratio of the stitched image does not suit the aspect ratio of the display screen cutting the stitched image comprises: in response to determining that the aspect ratio of the stitched image is greater than the aspect ratio of the display screen, only by cutting the stitched image in a width direction, causing the aspect ratio of the stitched image after cutting to suit the aspect ratio of the display screen, and in response to determining that the aspect ratio of the stitched image is smaller than the aspect ratio of the display screen, only by cutting the stitched image in the height direction, causing the aspect ratio of the stitched image after cutting to suit the aspect ratio of the display screen.

In some embodiments, the wide-angle image and the non-wide-angle image are respectively acquired by the wide-angle acquisition apparatus and the non-wide-angle acquisition apparatus which are set to be adjacent to each other.

In some embodiments, at least one of the image matching and the stitching is based on feature point matching.

In some embodiments, the resolutions of the wide-angle image and the non-wide-angle image are the same, and both of them are greater than the resolution of the display screen.

According to another aspect of the present disclosure, there is provided an electronic device comprising: a processor; and a memory coupled to the processor. The memory stores computer executable instructions, which when executed by a processor, cause the processor to perform a method comprising operations as follows: acquiring a wide-angle image and a non-wide-angle image acquired by a wide-angle acquisition apparatus and a non-wide-angle acquisition apparatus respectively, a view finding range of the wide-angle image including a view finding range of the non-wide-angle image; performing image matching between the wide-angle image and the non-wide-angle image to identify a first sub-image in the wide-angle image corresponding to the non-wide-angle image; based on the image matching between the wide-angle image and the non-wide-angle image, cutting out edge images from the wide-angle image, the edge images including at least a first edge sub-image and a second edge sub-image at two opposite sides of the first sub-image; stitching the edge images and the non-wide-angle image to obtain a stitched image, wherein the first edge sub-image and the second edge sub-image are stitched to corresponding sides of the non-wide-angle image, respectively; and outputting the stitched image for display.

In some embodiments, the wide-angle image and the non-wide-angle image are simultaneously acquired by the wide-angle acquisition apparatus and the non-wide-angle acquisition apparatus located on the same vertical line.

In some embodiments, when the instructions are executed by the processor, the processor performs the method further comprising operations as follows: before performing image matching between the wide-angle image and the non-wide-angle image to identify the first sub-image in the wide-angle image corresponding to the non-wide-angle image, performing distortion correction on the acquired wide-angle image.

In some embodiments, the first edge sub-image and the second edge sub-image partially overlap with the first sub-image, respectively.

In some embodiments, when the instructions are executed by the processor, the processor performs the method further comprising operations as follows: before outputting the stitched image for display, determining whether an aspect ratio of the stitched image suits an aspect ratio of a display screen; in response to determining that the aspect ratio of the stitched image suits the aspect ratio of the display screen, directly outputting the stitched image; and in response to determining that the aspect ratio of the stitched image does not suit the aspect ratio of the display screen, cutting the stitched image, and outputting the stitched image after cutting, wherein the aspect ratio of the stitched image after cutting suits the aspect ratio of the display screen.

In some embodiments, cutting the stitched image comprises: cutting edge parts of the stitched image, so that the center of a part corresponding to the first sub-image being used as the center of the stitched image after cutting.

In some embodiments, when the instructions are executed by the processor, the processor performs, in response to determining that the aspect ratio of the stitched image does not suit the aspect ratio of the display screen cutting the stitched image, by performing the following operations: in response to determining that the aspect ratio of the stitched image is greater than the aspect ratio of the display screen, only by cutting the stitched image in a width direction, causing the aspect ratio of the stitched image after cutting to suit the aspect ratio of the display screen, and in response to determining that the aspect ratio of the stitched image is smaller than the aspect ratio of the display screen, only by cutting the stitched image in the height direction, causing the aspect ratio of the stitched image after cutting to suit the aspect ratio of the display screen.

In some embodiments, resolutions of the wide-angle image and the non-wide-angle image are the same, and both of them are greater than a resolution of the display screen.

According to another aspect of the present disclosure, there is provided a non-transitory computer-readable storage medium, the computer-readable storage medium has computer programs stored thereon which when executed by a processor perform the method as described above.

BRIEF DESCRIPTION OF THE DRAWINGS

In order to explain technical solutions in embodiments of the present application more clearly, hereinafter the drawings which are needed to be used in description of embodiments of the present application will be briefly introduced.

DETAILED DESCRIPTION

Hereinafter, detail description of embodiments of the present application is given, examples of the embodiments are shown in the drawings, wherein the same or similar reference numerals denote the same or similar elements or elements that have substantially the same or similar function throughout. Embodiments described below with reference to the drawings are exemplary, are for the purpose of explaining the present application only, and can not be construed to limit the present invention.

Those skilled in the art may understood that, unless specifically indicated, the singular forms "a", "an", "said" and "the" used herein may also include the plurality forms. It will be further understood that the terms "comprises", "comprising", "includes" and/or "including," used in the specification of the present application, specify the presence of stated features, integers, steps, operations, elements and/or components, but do not preclude the presence or addition of one or more other features, integers, steps, operations, elements, components and/or groups thereof. It will be understood that when an element is referred to as being "connected" or "coupled" to another element, it may be directly connected or coupled to the other element or intervening elements may be present. In addition, "connected" or "coupled" used herein may include "wirelessly connected" or "wirelessly coupled". The term "and/or" as used herein includes all or any items and all combinations of one or more of the associated listed items.

In order to make goals, technical solutions and advantages of the present application more clear, embodiments of the present application will be further explained in detail in conjunction with drawings below.

Figure 1:
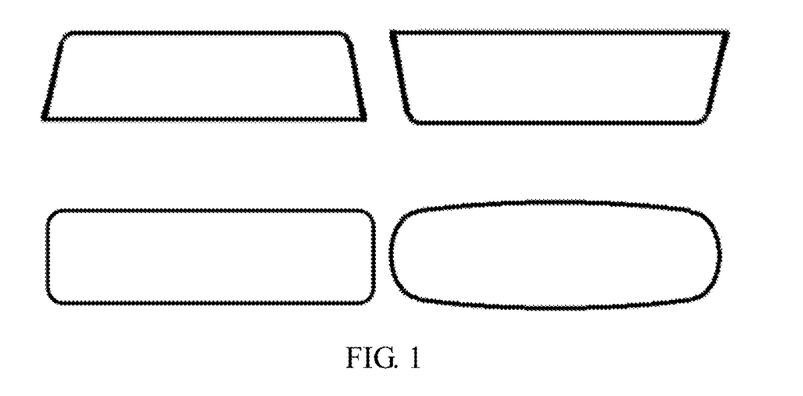
FIG. 1 is a schematic view of various irregular screens according to an embodiment of the present application.

With development of information technology, electronic devices also follow this development, most of current electronic devices have regular screens with an aspect ratio 4:3 or 16:9. However, with further development of the electronic devices, irregular screen apparatuses appear, e.g. a smart rearview mirror. Screens of the irregular screen apparatuses usually adopt various irregular strip screens, as shown in FIG. 1, the aspect ratio thereof is usually 4:1. But since most acquisition apparatuses, e.g. a smart rearview mirror camera, only support a preview picture with an aspect ratio 4:3 or 16:9.

In the relevant art, a method of displaying an image acquired by an acquisition apparatus through an irregular screen is: directly outputting the image acquired by the acquisition apparatus onto the irregular screen for display, or outputting the image acquired by the acquisition apparatus onto the irregular screen for full screen display after the image is stretched.

Figure 2:
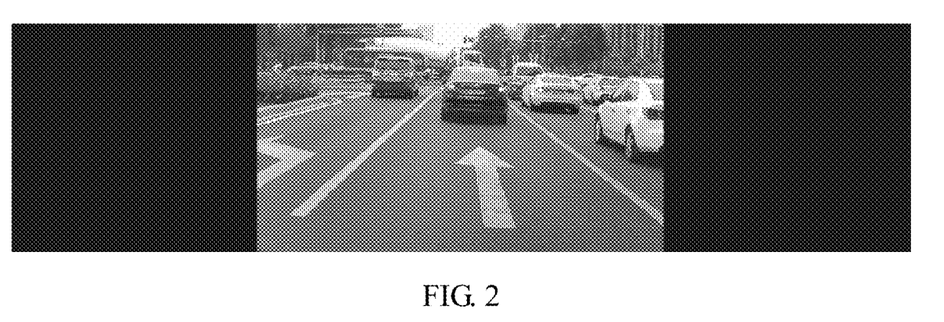
FIG. 2 is a schematic view of a display through an irregular screen in the relevant art.
Figure 3:
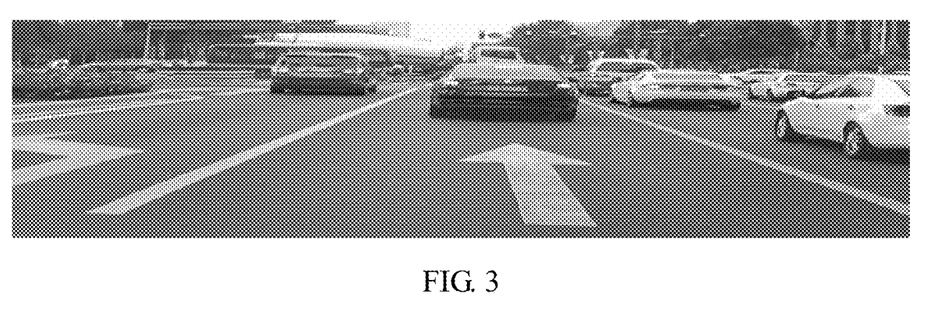
FIG. 3 is a schematic view of another display through an irregular screen in the relevant art.

However, when directly outputting the image acquired by the acquisition apparatus onto the irregular screen for display, the image may be only centralized and displayed in the middle of the irregular screen, large black regions in which no image is displayed exist at both sides of the screen, as shown in FIG. 2, as a result, the displayed picture is too small and is not easy to watch; or when outputting the image acquired by the acquisition apparatus onto the irregular screen for full screen display after the image is stretched, the image displayed through the irregular screen may be distorted and may be not clear, as shown in FIG. 3, so that the image acquired by the acquisition apparatus can not be displayed rationally through the irregular screen, which results in bad user experience.

The present application provides an improved image processing method, an improved electronic device and an improved computer-readable storage medium.

Figure 4A:
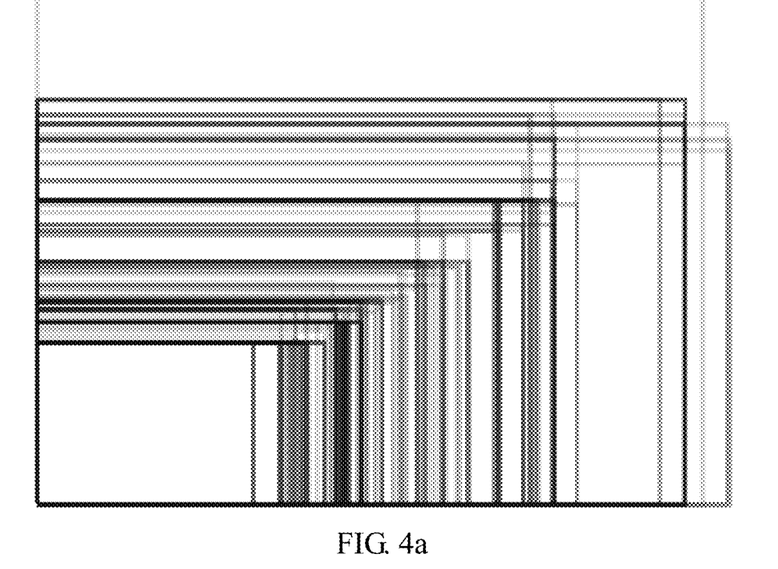
FIG. 4a is a schematic view of relevant various screen sizes.

At present, most of Android electronic devices (e.g. a cellphone as well as a tablet computer) support regular screens, wherein the aspect ratios of the regular screens are mostly 16:9 or 4:3, screen resolutions which they support are 1920*1080, 1280*800, 1280*768, 800*480 as well as 640*480, etc. Preview, photographing and video recording, etc, of current conventional cameras on the market also suit only regular screens with the aspect ratio 16:9 or 4:3. It may be seen from FIG. 4a that the aspect ratios of the regular screens which relevant systems support are mostly 16:9 or 4:3, wherein, in FIG. 4a, sizes of rectangles denote sizes of screens, shades of colors denote percentages of screens of different sizes.

With the appearance of the irregular screen products (e.g. various in-vehicle rearview mirrors), since images acquired by conventional image acquisition apparatuses (e.g., cameras) largely suit only display through the regular screens, the images acquired by conventional image acquisition apparatuses (e.g., cameras) are desired to better suit display through the irregular screens.

Figure 4B:
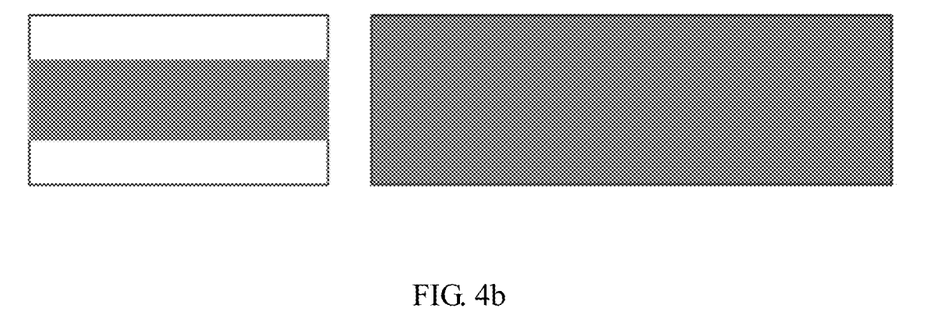
FIG. 4b is a schematic view of cutting out a part of a preview picture for enlarged full screen display on an irregular screen in the relevant art.
Figure 4C:
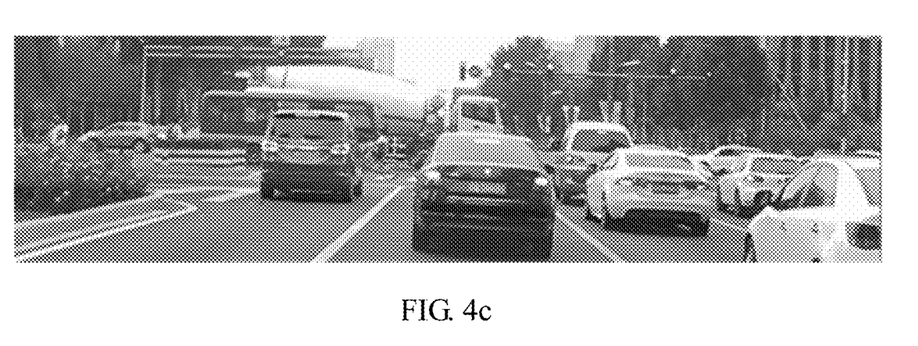
FIG. 4c is a schematic view of an effect of cutting out a part of a preview picture for enlarged full screen display on an irregular screen in the relevant art.

In addition to the two methods of displaying images acquired by the image acquisition apparatuses through the irregular screens mentioned above, it is also conceivable: cutting out a partial image from the image acquired by the image acquisition apparatus according to the aspect ratio of the irregular screen, and full-screen-displaying the cut out image through the irregular screen after enlarging the cut out image, as shown in FIG. 4b. For example, a partial image is cut out from an image acquired by a smart rearview mirror camera according to an aspect ratio of a smart rearview mirror screen, and the cut out image is full-screen-displayed through the smart rearview mirror after the cut out partial image is enlarged. A schematic view of an effect of displaying the image through the rearview mirror in this way is as shown in FIG. 4c. But since the image acquired by the image acquisition apparatus is cut out and then displayed, the current screen only displays a partial picture of the image. If the entire picture needs to be displayed, it is necessary to slide the split screen up and down to scroll and display it, so that a user can not acquire the entire picture of the image at a time, he needs to perform sliding to view the entire picture acquired by the image acquisition apparatus. Therefore, the rationality of displaying the image acquired by the image acquisition apparatus through the irregular screen is low, and user experience is bad.

With respect to the problems existing in the process of displaying the image acquired by the relevant image acquisition apparatus through the irregular screen in the relevant art, an embodiment of the present application provides a novel irregular screen display scheme, the scheme e.g. adopts a non-wide-angle camera and a wide-angle camera to acquire a wide-angle image and a non-wide-angle image, wherein a view finding range of the wide-angle image includes a view finding range of the non-wide-angle image, identifies a part in the wide-angle image corresponding to the non-wide-angle image based on image matching, cuts out edge images at two sides of the part corresponding to the non-wide-angle image from the wide-angle image, stitches/fuses/cuts the non-wide-angle image and the edge images, to cause the aspect ratio of the stitched/fused/cut image to suit the aspect ratio of the irregular screen, so that the user can observe a wider view finding range on the irregular screen and simultaneously ensure a good definition and a real picture display effect.

Figure 4D:
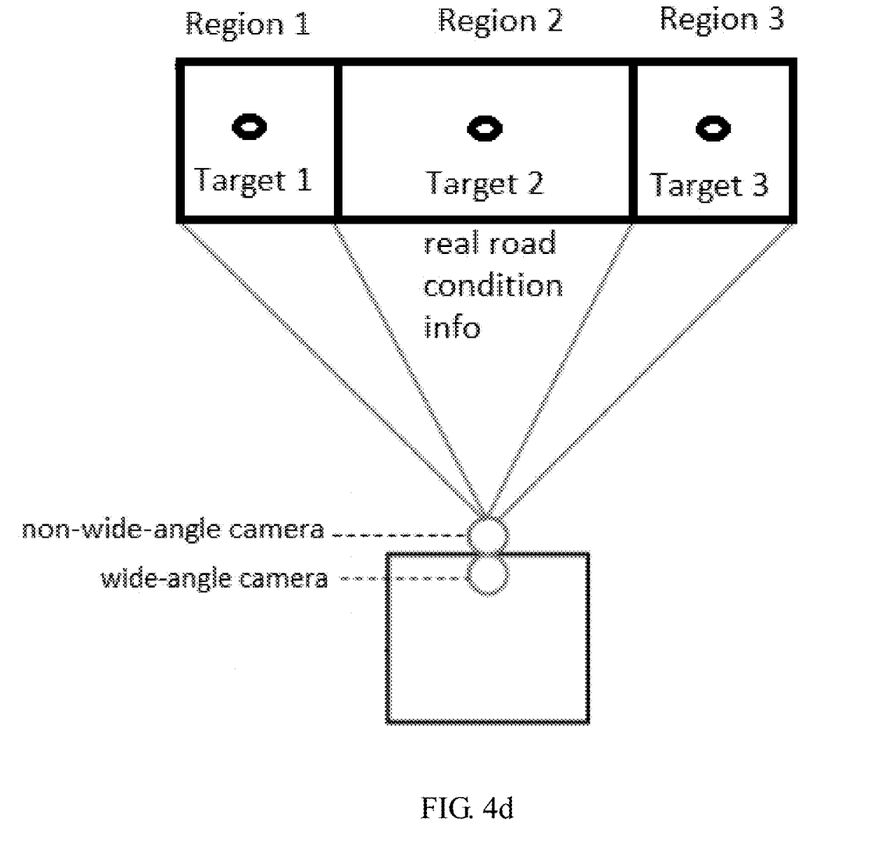
FIG. 4d is a schematic view of a hardware design of an irregular screen display according to an embodiment of the present application.

In some embodiments of the present application, two cameras are involved, a first camera as well as a second camera, respectively, wherein the first camera is a wide-angle camera, the second camera is a non-wide-angle camera, and images are acquired by the first camera as well as the second camera, respectively. For example, embodiments of the present application may be applied to an in-vehicle system. As shown in FIG. 4d, the first camera (the wide-angle camera) as well as the second camera (the non-wide-angle camera) may be installed at a location of the rearview mirror of the vehicle. In some embodiments, the first camera and the second camera are set to be adjacent to each other, i.e. set at approximately the same photographing site. In some embodiments, the first camera as well as the second camera may be located on the same vertical line. The second camera may be located above or under the first camera. Since the non-wide-angle camera has a narrow viewing angle, the view finding range can only cover a region 2 in FIG. 4d, therefore the camera according to this viewing angle may only acquire an image of a target 2, and may not acquire images corresponding to a target 1 as well as a target 3. Whereas, the wide-angle camera has a wider viewing angle, has a larger view finding range, and at approximately the same photographing site, the wide-angle camera may photograph a region 1, the region 2 as well as a region 3, and therefore by the wide-angle camera, it is possible to acquire not only an image including the target 2, but also images including the target 1 as well as the target 3.

However, since images acquired by the non-wide-angle camera are more real than images acquired by the wide-angle camera, are not distorted and have a high definition, the middle region may use the image photographed by the non-wide-angle camera; the wide viewing angle image acquired by the wide-angle camera may be used to compensate for images of regions at two sides which can not be acquired by the non-wide-angle camera; therefore, parts corresponding to regions at two sides are cut out from the image photographed by the wide-angle camera, and image stitching (if necessary, and cutting) is performed on the cut out part and the image acquired by the non-wide-angle camera, so that the aspect ratio of the image after the processing can suit the aspect ratio of the irregular screen, then the image is displayed on the irregular screen.

In other words, the middle region of the non-wide-angle camera image is more clear and is not distorted, but the viewing angle of the photographing of the non-wide-angle camera is narrow, it can not acquire an edge region image within a wider range; the viewing angle of the photographing of the wide-angle camera is wide, it can acquire the edge region image within the wider range, but there is a certain degree of distortion in the image picture acquired by the wide-angle camera, therefore in the present application, image stitching is performed on the images acquired by the two cameras, to attain a better image display effect of the irregular screen.

Hereinafter, specific embodiments are used to explain technical solutions of the present application as well as how technical solutions of the present application solve the above mentioned technical problems in detail. Hereinafter, the several specific embodiments may be combined with each other, repeated description of the same or similar concepts or processes may not be made in certain embodiments. Hereinafter, in conjunction with the drawings, embodiments of the present application will be described.

Figure 5:
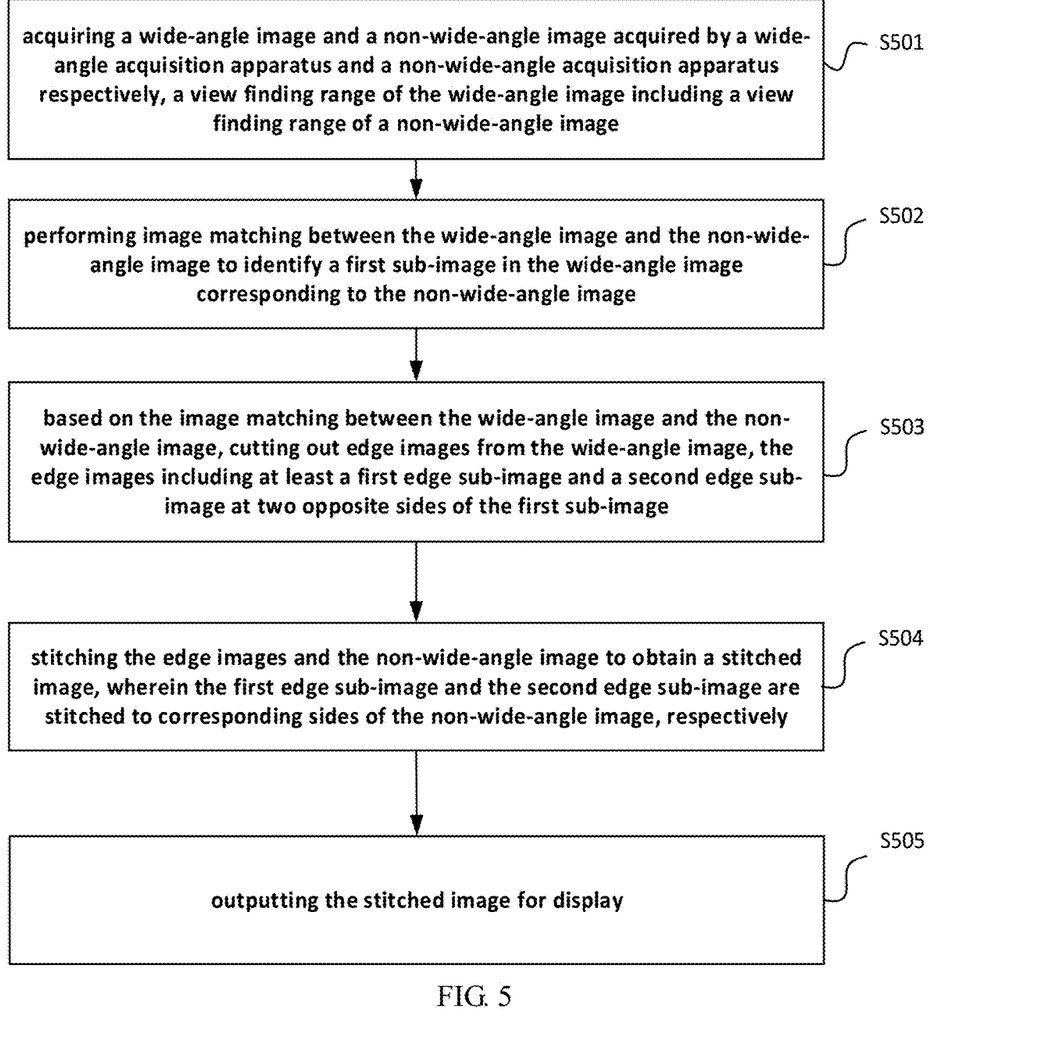
FIG. 5 is a schematic view of a flow of an image processing method according to an embodiment of the present application.

An embodiment of the present application provides a method, as shown in FIG. 5, the method includes:

Step S501, acquiring a wide-angle image and a non-wide-angle image acquired by a wide-angle acquisition apparatus and a non-wide-angle acquisition apparatus respectively, wherein a view finding range of the wide-angle image includes a view finding range of a non-wide-angle image.

As described above, the wide-angle acquisition apparatus and the non-wide-angle acquisition apparatus may be set to be adjacent to each other, i.e. located at approximately the same photographing site. In the wide-angle image acquired in this way, an image part corresponding to the non-wide-angle image may be nearly located in the middle of the wide-angle image, which is advantageous to later image cutting.

The wide-angle acquisition apparatus and the non-wide-angle acquisition apparatus may be located on the same vertical line. In the wide-angle image acquired in this way, an image part corresponding to the non-wide-angle image may be just located in the middle of the wide-angle image, which is advantageous to later image cutting.

In some embodiments of the present application, the wide-angle image and the non-wide-angle image are acquired at the same time. For example, the wide-angle acquisition apparatus and the non-wide-angle acquisition apparatus acquire the wide-angle image and the non-wide-angle image at the same time. For example, when the wide-angle acquisition apparatus and the non-wide-angle acquisition apparatus are initialized, they are set to operate in synchronization with each other. For example, when the wide-angle acquisition apparatus and the non-wide-angle acquisition apparatus are initialized, they are set to perform acquisition and output at the same frame rate.

In some embodiments of the present application, resolutions of the wide-angle acquisition apparatus and the non-wide-angle acquisition apparatus are the same, and both of them are greater than the resolution of the irregular screen. For example, both resolutions of the wide-angle acquisition apparatus and the non-wide-angle acquisition apparatus may be 1920*1080, while the resolution of the irregular screen is 1920*480. This is helpful in providing a clear display effect. But the present application is not limited thereto, the resolution of the wide-angle acquisition apparatus may be greater than the resolution of the non-wide-angle acquisition apparatus and the resolution of the irregular screen, the resolution of the wide-angle acquisition apparatus and the resolution of the non-wide-angle acquisition apparatus may be the same and smaller than the resolution of the irregular screen, etc.

In some embodiments of the present application, the non-wide-angle image is not distorted, but the viewing angle of acquisition is narrow, and the images of wider regions at two ends can not be acquired. In conjunction with FIG. 4*d*, for example, FIG. 6*a* shows an image A photographed by the non-wide-angle camera, the view finding range thereof only covers the region 2 in FIG. 4*d*.

Figure 6A:
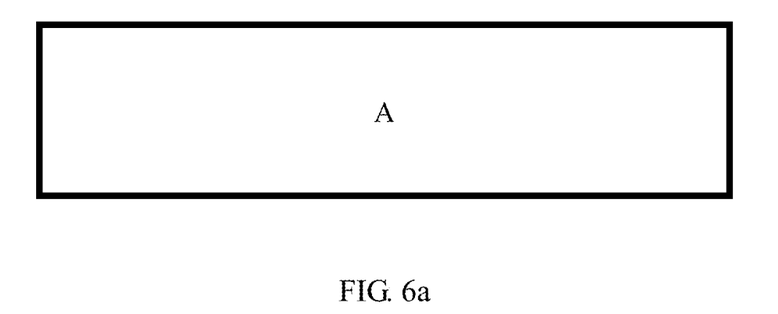
FIG. 6a is a schematic view of a non-wide-angle image according to an embodiment of the present application.
Figure 6B:
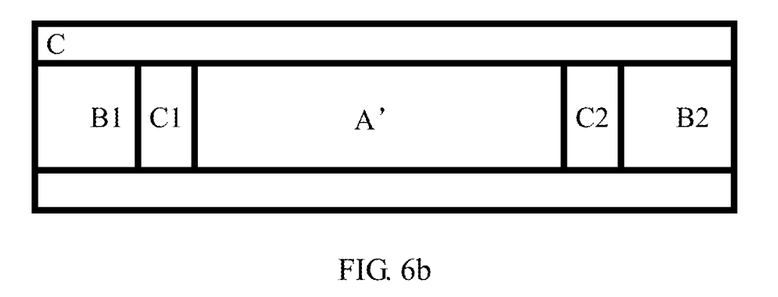
FIG. 6b is a schematic view of a wide-angle image according to an embodiment of the present application.

For example, FIG. 6*b* shows a complete wide-angle image C photographed by the wide-angle camera, the view finding range thereof covers the view finding range of the non-wide-angle camera. The image C includes an image A' of the region 2 (also called a first sub-image herein), the image A' corresponds to the image A photographed by the non-wide-angle camera, i.e. the photographed content thereof is essentially the same as that of the non-wide-angle image A. The image C also includes edge images B1 and B2 at two sides of the image A', wherein the edge image B1 includes the image of the region 1 in FIG. 4*d*, B2 includes the image of the region 3 in FIG. 4*d*. Those skilled in the art may understand that, FIG. 6*b* is merely a schematic view, an actual wide-angle image will include certain distortion, therefore, e.g. the image A' of the region 2 may include corresponding distortion.

Step S502, performing image matching between the wide-angle image and the non-wide-angle image to identify the first sub-image A' in the wide-angle image corresponding to the non-wide-angle image A.

That is to say, with respect to the non-wide-angle image A in FIG. 6*a* and the wide-angle image C in FIG. 6*d*, image matching is performed by feature comparison or grayscale comparison etc., to identify the first sub-image A' in the wide-angle image C corresponding to the non-wide-angle image A.

In some embodiments of the present application, the image matching, for example, may use a feature point based detection algorithm, e.g. an angular point based local feature point detection and image matching algorithm, a spot based local feature point detection and image matching algorithm, etc. The image matching may also use any other algorithm, as long as the first sub-image A' corresponding to the non-wide-angle image A can be identified from the wide-angle image.

Step S503, based on the image matching between the wide-angle image and the non-wide-angle image, cutting out edge images from the wide-angle image, the edge images including at least a first edge sub-image and a second edge sub-image at two opposite sides of the first sub-image.

As described above, the first sub-image A' in the wide-angle image C corresponding to the non-wide-angle image A has already been identified, and then the edge images are cut out from the wide-angle image C, the edge images include at least the first edge sub-image and the second edge sub-image at two opposite sides of the first sub-image. In some embodiments, as shown in FIG. 6*d*, the edge images may include only edge images B1 and B2 at two opposite sides of the first sub-image A', i.e. the edge images B1 and B2 are cut out as the first edge sub-image and the second edge sub-image respectively.

In some embodiments, the first edge sub-image and the second edge sub-image may include not only the edge images B1 and B2, but also at least a part of the first sub-image A' located at the two sides, e.g. overlap parts C1 and C2. In other words, the first edge sub-image and the second edge sub-image may partially overlap with the first sub-image A' at the two sides, respectively. Such partially overlapping may be useful for subsequent image stitching.

Step S504, stitching the edge images and the non-wide-angle image to obtain a stitched image, wherein the first edge sub-image and the second edge sub-image are stitched to corresponding sides of the non-wide-angle image, respectively.

In an embodiment of the present application, the first edge sub-image (including B1; or including B1 and C1) is stitched to the non-wide-angle image A at a left side of the non-wide-angle image A, the second edge sub-image (including B2; or including B2 and C2) is stitched to the non-wide-angle image A at a right side of the non-wide-angle image A, so that the stitched image after stitching is obtained.

In some embodiments of the present application, it is possible to stitch the first edge sub-image and the second edge sub-image to the non-wide-angle image by a feature point stitching algorithm. The stitching process generally includes image registration and image fusion. Taking stitching of the first edge sub-image and the non-wide-angle image as an example, the stitching process, for example, includes the following steps:

S1: performing feature point extraction on two images to be stitched (e.g. the first edge sub-image and the non-wide-angle image) respectively;

S2: matching feature points of the two images to be stitched, to obtain a feature point matched pair set φ;

S3: based on plane similarity, screening the feature point matched pairs, specific steps including:

S3.1: initializing a selection matched pair set S to be an empty set;

S3.2: choosing K minimal sample sets $\{C_1, C_2, \ldots, C_K\}$ randomly from the matched pair set φ, wherein each minimal sample set includes 4 feature point matched pairs; computing a homography matrix corresponding to each minimal sample set, to obtain K homography matrix set $\{T_1, T_2, \ldots, T_K\}$, wherein $T_k$ denotes a homography matrix corresponding to a kth minimal sample set, k=1, 2, ..., K;

S3.3: computing residuals of each matched pair $X_i$ in the matched pair set φ and each homography matrix in the homography matrix set $\{T_1, T_2, \ldots, T_K\}$, K residuals corresponding to each matched pair $X_i$ constituting one residual vector $d_i=[d_{i1}, d_{i2} \ldots d_{iK}]$, wherein $d_{iK}$, denotes a residual of the matched pair $X_i$ and the homography matrix $T_k$;

S3.4: with respect to all the matched pairs in the matched pair set φ, computing the plane similarity between every two matched pairs, a computation formula of the plane similarity $f(X_i, X_j)$ any two matched pairs $X_i$ and $X_j$ is: $f(X_i, X_j) = \Sigma_{K=1}^{K} \varphi_{ij}^K$, wherein, the definition of $\varphi_{ij}^K$ is:

$$\varphi_{ij}^K = \begin{cases} 1, & \text{if } d_{ik} < \varepsilon \text{ and } d_{jk} < \varepsilon \\ 0, & \text{other cases} \end{cases},$$

$d_{ik}$, denotes residual of the matched pair $X_i$ and the homography matrix $T_k$, $d_{jk}$ denotes residual of the matched pair $X_j$ and the homography matrix $T_k$, ε is a preset residual threshold value;

S3.5: computing the sum $F(X_i)$ of the plane similarity $f(X_i, X_j)$ of each matched pair $X_i$ and all other matched pairs in the matched pair set φ, selecting a matched pair $X_i'$ with the largest $F(X_i)$ as the key matched pair of this screening, computing a mean value favg of the plane similarity $f(X_i', X_j)$ of the matched pair Xi' and other matched pairs, screening matched pairs with $f(X_i', X_j)$>favg, to constitute a matched pair set S' together with the matched pair Xi', adding the matched pair set S' to the selection matched pair set S, and deleting these matched pairs from the matched pair set φ;

S3.6: if IS wherein |S'|<τ||φ||<τ, wherein |S"| denotes the number of matched pairs in the matched pair set S' of this screening, |φ| denotes the number of matched pairs in the matched pair set φ, τ denotes a preset number threshold value, ending the screening, otherwise returning to step S3.2;

S4: computing a transformation matrix H of the two images to be stitched according to the matched pairs in the selection matched pair set S screened and obtained in step S3, using the transformation matrix H to transform the two images to be stitched into the same coordinate system;

S5: finding an optimal stitching line L in an image overlap region of the two images to be stitched which are transformed into the same coordinate system;

S6: according to the optimal stitching line L obtained in step S5, fusing the two images to be stitched which are transformed into the same coordinate system, to obtain an image stitching result.

With respect to stitching of the second edge sub-image and the non-wide-angle image, the method is similar, repeated description is no longer made herein.

Those skilled in the art may understand that, the stitching algorithm of images is not limited to the algorithm described above as the example, any image stitching algorithm in the prior art may be used to achieve the image stitching in the present application.

Figure 7:
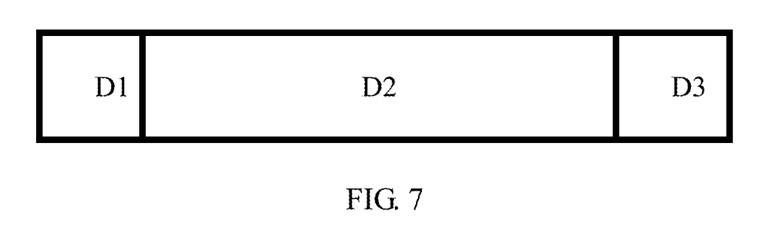
FIG. 7 is a schematic view of a stitched image according to an embodiment of the present application.

FIG. 7 illustrates an exemplary stitched image D, wherein, a middle part D2 thereof basically corresponds to the non-wide-angle image A, while parts D1 and D3 at two sides basically correspond to the first edge sub-image and the second edge sub-image in the wide-angle image, respectively.

In some embodiments of the present application, by stitching the first edge sub-image and the second edge sub-image to two sides of the non-wide-angle image respectively, a stitched image is obtained for being displayed through the irregular screen. The stitched image includes both the non-wide-angle image which has no distortion and has a high definition, and the images within the range of the two sides beyond the view finding range of the non-wide-angle image in the wide-angle image, so that the user can observe a wider view finding range on the irregular screen and simultaneously ensure a good definition and a real picture display effect.

Step S505, outputting the stitched image for display.

In some embodiments of the present application, the stitched image is used to be displayed on the irregular screen. For example, the irregular screen is a smart rearview mirror installed on a car, i.e. the image after the stitching process is displayed on the smart rearview mirror.

The above embodiment is described according to an example in which the forward wide-angle camera and the forward non-wide-angle camera are installed at the location of the rearview mirror of the car and the display screen is placed transversely. Those skilled in the art should understand that, without departing from the spirit of the present invention, various modifications may be made. For example, the wide-angle and the non-wide-angle cameras may be installed at the back of the car and may be installed backwardly, so that an observation range of the road condition behind the car can be extended. The wide-angle and the non-wide-angle cameras may also be installed in other positions, those skilled in the art may set the cameras as necessary by themselves.

In some embodiments, for example, the irregular screen, e.g. a smart rearview mirror, may be placed longitudinally, and edge images including the first edge sub-image and the second edge sub-image at a top side and a bottom side of the first sub-image are cut out from the wide-angle image. The specific processing method is similar to the method exemplified in FIG. 5, repeated description is no longer made herein.

As described above, in comparison with the relevant art, an embodiment of the present application provides a novel irregular screen display scheme, the scheme e.g. adopts a non-wide-angle camera and a wide-angle camera to acquire a wide-angle image and a non-wide-angle image, wherein a view finding range of the wide-angle image includes a view finding range of the non-wide-angle image, identifies a part in the wide-angle image corresponding to the non-wide-angle image based on image matching, cuts out edge images at two sides of the part corresponding to the non-wide-angle image from the wide-angle image, stitches the non-wide-angle image and the edge images to obtain a stitched image for being displayed on the irregular screen. The stitched image includes both the non-wide-angle image which has no distortion and has a high definition, and the images within the range of the two sides beyond the view finding range of the non-wide-angle image in the wide-angle image, so that the user can observe a wider view finding range on the irregular screen and simultaneously ensure a good definition and a real picture display effect.

In other words, the edge images are cut out from the wide-angle image, and the edge images are stitched on the non-wide-angle image, to obtain for being displayed on the irregular screen, Since the aspect ratio of the stitched image increases, with respect to displaying the image after stitching through the irregular screen, there is not the case where the image is only centralized and displayed in the middle and is not easy to watch, and moreover, since the output image does not need to be overstretched to be displayed, the image displayed through the irregular screen will not be distorted badly, so that it is possible to improve the display effect of the image, and further improve user experience.

In some embodiments of the present application, since the wide-angle image is prone to distortion, it is necessary to perform distortion correction on the wide-angle image. In some embodiments of the present application, before image matching is performed on the wide-angle image and the non-wide-angle image, distortion correction is performed on the wide-angle image.

Various image distortion correction algorithms may be used to perform distortion correction on the wide-angle image.

For example, the image distortion correction algorithm being used to perform distortion correction on the wide-angle image may include the following steps:

Step one, establishing a corresponding position relation between the distorted image and a world coordinate system:

first, any one point $O=[X, Y, Z, 1]^T$ in the world coordinate system is set, a camera coordinate of a corresponding correction image is $P=[X_c, Y_c, Z_c]^T$, a distortion image coordinate is $Q=(u, v)$, a correction image coordinate is $Q'=(u', v')$, a projection imaging model is described by the following formula:

$$P=MO \quad (1)$$

wherein, in the formula (1), M is a projection matrix, $M \in R^{3 \times 4}$, $M=[R|T]$, $R^{3 \times 3}$ is a rotation matrix, $T \in R^{3/1}$ is a translation vector; then a relation model of the distortion image and the correction image is established as follows:

$$\mu = fx * \left[ \frac{(1 + k_1 r^2 + k_2 r^4 + k_3 r^6)}{(1 + k_4 r^2 + k_5 r^4 + k_6 r^6)} x_o + 2 p_2 x_o y_o + p_2 (r^2 + x_o^2) \right] + \mu_o \quad (2)$$

$$v = fy * \left[ \frac{(1 + k_1 r^2 + k_2 r^4 + k_3 r^6)}{(1 + k_4 r^2 + k_5 r^4 + k_6 r^6)} y_o + (p_2 (r^2 + y_o^2) + 2 p_2 x_o y_o) \right] + v_0 \quad (3)$$

wherein, in the formulas, $k_1, k_2, k_3, k_4, k_5, k_6$ are radial distortion parameter, $\rho_1, \tau_2$ are tangential distortion parameters, fx, fy, $\mu_0$, $v_0$ are internal parameters of the camera, r is a distance between a projection point under the camera coordinate system and the origin of the camera coordinate system, $x_c=X_c/Z_c$, $y_c=Y_c/Z_c$;

Step two, using a planar calibration target arranged with alternate black and white rectangular or square checks to take multiple pictures, as calibration images, detecting image coordinates of points at which every four checks intersect, i.e. angular points, on the calibration target, establishing a corresponding relationship of the calibration target and the calibration image according to the projection imaging model of step 1, computing an image coordinate back projection error: ∥d−d'∥, in the formular, ∥•∥ denotes 12 norm, d being the image coordinate of the angular point of the calibration target, d' being the world coordinate system coordinate of the angular point of the calibration target, and by projection of the projection imaging model of step one under the image coordinate system, establishing an objective function: $\varepsilon = \sum_{j=1}^{m} \|d_j - d'_j\|^2$, ε being a back projection error square, m being the total number of the angular points, j being an index number of the angular point, judging whether the objective function satisfies a preset accuracy requirement, and if the objective function does not satisfy the accuracy requirement, using a descent iteration algorithm to perform nonlinear optimization, to obtain optimized lens internal parameters and distortion parameters;

Step three, the lens internal parameters and the distortion parameters obtained according to step two, being substituted in the formulas (2) and (3) for computation, to obtain space data of the corrected image, wherein, a relation between the correction image coordinate u' and v' is $u' = x_c \cdot fx + u_0$, $v' = y_c \cdot fy + v_0$;

Step 4, using a nearest neighbor interpolation formula to finish correction on correction image value assignment, the nearest neighbor interpolation formula: $g(u', v') = g(u'_{int}, v'_{int})$, $g(u', v')$ is a pixel value of the image at $(u', v')$, $u'_{int}$, $v'_{int}$ are integer parts of u', v'.

In some embodiments of the present application, by performing distortion correction on the wide-angle image, the image after distortion correction can be made more close to the real picture, so that it is possible to improve the reality of the image displayed through the irregular screen, further improve user experience.

Those skilled in the art may understand that, the above distortion correction algorithm is described merely as an example, but not limit the present application. The present application may use any suitable distortion correction algorithm.

Figure 8:
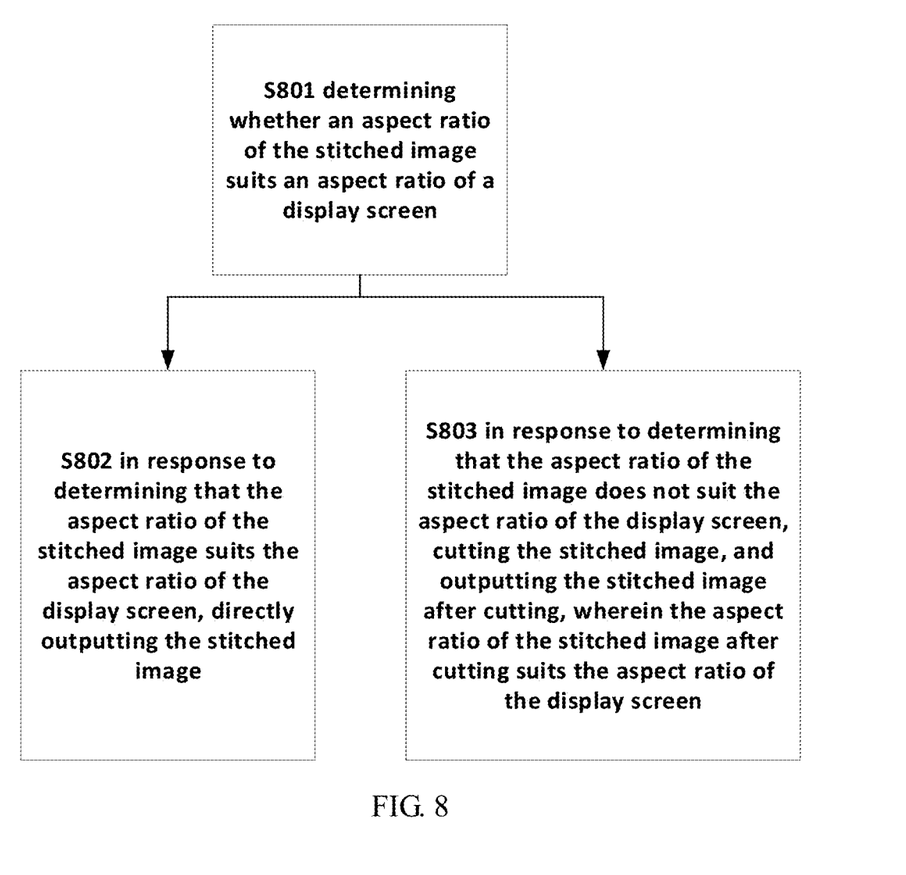
FIG. 8 is a schematic view of a flow of a method for processing a stitched image according to an embodiment of the present application.

FIG. 8 illustrates a method 800 for processing a stitched image according to some embodiments of the present application.

In some embodiments, the method may also include the following steps:

Step S801, determining whether the aspect ratio of the stitched image suits the aspect ratio of display screen.

In an embodiment of the present application, the aspect ratio of the stitched image may be understood to be a ratio of the width (in a transverse direction) of the stitched image to the height (in a longitudinal direction), the aspect ratio of the display screen may be understood to be a ratio of the width (in the transverse direction) of the display screen and the height (in the longitudinal direction).

In some embodiments, the aspect ratio of the stitched image suiting the aspect ratio of the display screen refers to the aspect ratio of the stitched image being exactly the same as the aspect ratio of the display screen.

In some other embodiments, the aspect ratio of the stitched image suiting the aspect ratio of the display screen refers to the aspect ratio of the stitched image approximating the aspect ratio of the display screen. This is similar to a case where a display screen of the aspect ratio 16:9 may support images with resolutions (e.g. 480*272, 1280*720, 1366*768, 1920*1080) of different aspect ratios, a display screen of the aspect ratio 4:3 may support images with resolutions (e.g. 800*600, 1024*768, 1152*864, 1280*960, 1280*1024) of different aspect ratios.

Step S802, in response to determining that the aspect ratio of the stitched image suits the aspect ratio of the display screen, directly outputting the stitched image.

In a case where the aspect ratio of the stitched image exactly suits the aspect ratio of the display screen, the stitched image may be directly output to the display screen to be displayed on the display screen.

Step S803, in response to determining that the aspect ratio of the stitched image does not suit the aspect ratio of the display screen, cutting the stitched image, and outputting the stitched image after cutting, wherein the aspect ratio of the stitched image after cutting suits the aspect ratio of the display screen.

In some embodiments, when cutting the stitched image, edge parts of the stitched image are cut, so that the center of the part corresponding to the first sub-image is used as the center of the stitched image after cutting. For example, it is possible to cut parts of the same size from edges at two sides. It is also possible to, for example, cut edges by taking the center line of the part corresponding to the first sub-image as a reference, retain parts of the same size at two sides of the center line. This is in order to ensure that the middle part of the finally displayed image is the part corresponding to the non-wide-angle image as much as possible.

In some embodiments, step S803 may further include: in response to determining that the aspect ratio of the stitched image is greater than the aspect ratio of the display screen, only by cutting the stitched image in the width direction, causing the aspect ratio of the stitched image after cutting to suit the aspect ratio of the display screen.

For example, with respect to a transversely set display screen, it is assumed that the aspect ratio of the stitched image is 1920/300, while the aspect ratio of the irregular screen is 1920/480, then the stitched image is not cut in the height direction, but edge parts of an appropriate size are cut away from the stitched image in the width direction.

Again, for example, with respect to a longitudinally set display screen, it is assumed that the aspect ratio of the stitched image is 600/1920, while the aspect ratio of the irregular screen is 480/1920, then the stitched image is not cut in the height direction, but edge parts of an appropriate size are cut away from the stitched image in the width direction.

In some embodiments, step S803 may further include: in response to determining that the aspect ratio of the stitched image is smaller than the aspect ratio of the display screen, only by cutting the stitched image in the height direction, causing the aspect ratio of the stitched image after cutting to suit the aspect ratio of the display screen.

For example, with respect to a transversely set display screen, it is assumed that the aspect ratio of the stitched image is 1920/600, while the aspect ratio of the irregular screen is 1920/480, then the stitched image is not cut in the width direction, but edge parts of an appropriate size are cut away from the stitched image in the height direction.

Again, for example, with respect to a longitudinally set display screen, it is assumed that the aspect ratio of the stitched image is 300/1920, while the aspect ratio of the irregular screen is 480/1920, then the stitched image is not cut in the width direction, but edge parts of an appropriate size are cut away from the stitched image in the height direction.

In some embodiments of the present application, the method of displaying through the irregular screen is applicable to displaying an image acquired by an acquisition apparatus which supports Android system, and is also applicable to displaying an image acquired by an acquisition apparatus which supports other operation systems, e.g. Linux system. This is not limited herein.

The specific image processing flow involved in some embodiments of the present application may be implemented in a system application layer, and after the application layer acquires the image, it invokes various image processing algorithm libraries, the algorithm finally returns image data, directly outputs the image data to the application layer for display by the screen, this method has strong transportability, does not depend on the system itself; meanwhile, the specific image processing flow involved in some embodiments of the present application may also be implemented in a system driver layer, hardware driver layers of two kinds of acquisition apparatuses directly acquire each frame image, transfer it to an image algorithm processing unit, and after the algorithm processing unit processes the image, the result is returned to the driver layer, and after the driver layer extends one interface path of the irregular screen size, the irregular picture may be directly returned to upper layer software through the extended driving interface, to directly display the final result, this scheme needs to modify system layer codes, but has high efficiency and good stability.

Figure 9:
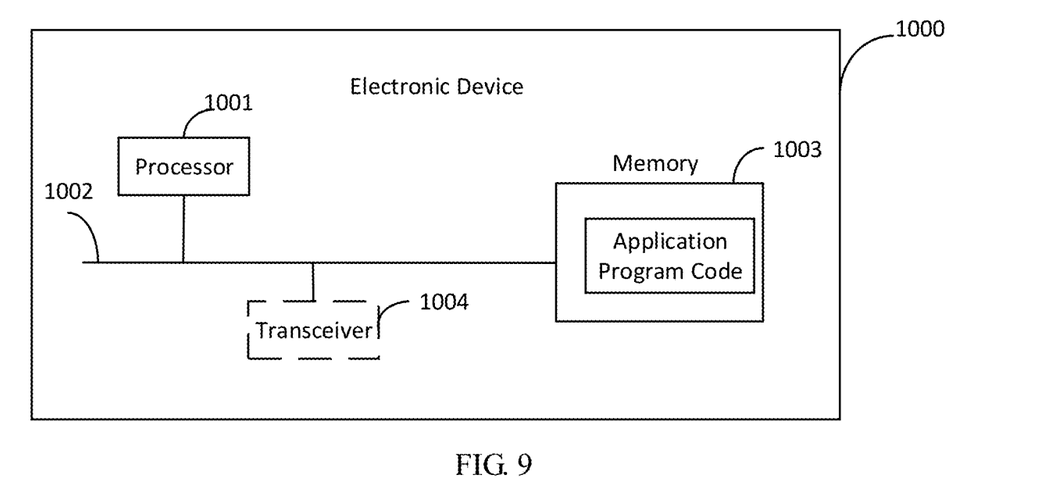
FIG. 9 is a schematic view of a structure of an electronic device according to an embodiment of the present application.

FIG. 9 illustrates a general structure diagram of an electronic device for implementing a method according to an embodiment of the present invention.

As shown in FIG. 9, an electronic device 1000 shown in FIG. 9 includes: a processor 1001 and a memory 1003. Wherein, the processor 1001 and the memory 1003 are connected, such as through a bus 1002. Optionally, the electronic device 1000 may also include a transceiver 1004. It is to be noted that, in a practical application, the number of the transceivers 1004 is not limited to one, the structure of the electronic device 1000 does not limit an embodiment of the present application. The transceiver 1004 includes a receiver and a transmitter.

The processor 1001 may be CPU, a general-purpose processor, DSP, ASIC, FPGA or other programmable logic devices, transistor logic devices, hardware components or any combination thereof. It may implement or execute various exemplary logic blocks, modules and circuits described in conjunction with content disclosed in the present application. The processor 1001 may also be a combination implementing computational functions, e.g. include a combination of one or more microprocessors, a combination of DSPs and microprocessors, etc.

The bus 1002 may include one path for transmitting information between the above mentioned assemblies. The bus 1002 may be a PCI bus or an EISA bus, etc. The bus 1002 may include an address bus, a data bus, a control bus, etc. For ease of illustration, FIG. 9 uses only one thick line to denote the bus 1002, but that does not means that there is only one bus or one type of bus.

The memory 1003 may be ROM or other types of static storage apparatuses which may store static information and instructions, RAM or other types of dynamic storage apparatuses which may store information and instructions, may also be EEPROM, CD-ROM or other optical disk storage, optical disc storage (including compact discs, laser discs, optical discs, digital versatile discs, Blu-ray discs), magnetic disk storage media or other magnetic storage apparatuses, or any other medium that can be used to carry or store desired program codes in the form of instructions or data structures and that can be accessed by a computer, but not limited thereto.

The memory 1003 stores application program codes for executing respective steps of a method according to an embodiment of the present application, and the application program codes are controlled and executed by the processor 1001. The processor 1001 is used to execute the application program codes stored in the memory 1003, to execute respective steps of a method according to an embodiment of the present application.

In some embodiments, the electronic device 1000 may include a display screen, a stitched image obtained according to the method of the embodiment of the present application is input to the display screen to be displayed on the display screen.

In some embodiments, the electronic device 1000 may also include a wide-angle acquisition apparatus and a non-wide-angle acquisition apparatus, which are used to acquire a wide-angle image and a non-wide-angle image, respectively.

In some embodiments, the electronic device 1000 may include multiple separate hardware units, these hardware units are connected with each other through various interfaces.

In some embodiments, the electronic device 1000 may also be an independent hardware unit, connect with an externally set wide-angle acquisition apparatus and an externally set non-wide-angle acquisition apparatus through various interfaces, and/or connect with an externally set display screen through various interfaces.

An embodiment of the present application provides a non-transitory computer-readable storage medium, the computer-readable storage medium has computer programs stored thereon which when executed by a processor perform methods according to embodiments of the present application.

It should be understood that, although respective steps in flowcharts of the drawings are shown in order according to indication of arrows, these steps are not necessarily executed in order according to the sequence indicated by the arrows. Unless specifically stated herein, the sequence of execution of these steps is not strictly limited, they may be executed in other sequences. Moreover, at least some steps in flowcharts of the drawings may include multiple substeps or multiple stages, these substeps or stages are not necessarily executed and completed at the same time, but may be executed at different times, the sequence of execution thereof is also not necessarily done in order, but may be executed by turns or alternately with at least a part of other steps or substeps or stages of other steps.

Only a part of embodiments of the present invention are described above, it should be pointed out that, those ordinary skilled in the art may also make some improvements and modifications without departing from the principle of the present invention, these improvements and modifications are also to be considered to be the protection scope of the present invention.

What is claimed is:

1. A method comprising:
    acquiring, from a wide-angle acquisition apparatus and a non-wide-angle acquisition apparatus respectively, a wide-angle image and a non-wide-angle image acquired by the wide-angle acquisition apparatus and the non-wide-angle acquisition apparatus respectively at a same time, wherein the wide-angle acquisition apparatus and the non-wide-angle acquisition apparatus are located at a rearview mirror in a vehicle and are adjacent to each other on a same vertical line so as to be at a same photographing site, a view finding range of the wide-angle image including a view finding range of the non-wide-angle image, and an image part corresponding to the non-wide-angle image is located in the middle of the wide-angle image;
    performing distortion correction on the acquired wide-angle image;
    performing image matching between the wide-angle image after distortion correction and the non-wide-angle image to identify a first sub-image in the wide-angle image corresponding to the non-wide-angle image;
    based on only the image matching between the wide-angle image and the non-wide-angle image, cutting out edge images from the wide-angle image along a direction of a longer of a width and a height of an irregular display screen, wherein the edge images includes a first edge sub-image and a second edge sub-image at two opposite sides of the first sub-image, the first edge sub-image and the second edge sub-image are entire edges at the two opposite sides of the first sub-image in the wide-angle image and the image matching is based on feature point matching;
    stitching the edge images and the non-wide-angle image to obtain a stitched image, wherein the first edge sub-image and the second edge sub-image are stitched to corresponding sides of the non-wide-angle image, respectively;
    determining whether an aspect ratio of the stitched image suits an aspect ratio of the irregular display screen;
    in response to determining that the aspect ratio of the stitched image suits the aspect ratio of the display screen, directly outputting the stitched image to the irregular display screen for display;
    in response to determining that the aspect ratio of the stitched image does not suit the aspect ratio of the irregular display screen, cutting the stitched image, and outputting the stitched image after cutting, wherein the aspect ratio of the stitched image after cutting suits the aspect ratio of the irregular display screen, wherein cutting the stitched image comprises cutting edge parts of the stitched image by taking a centerline of a part corresponding to the first sub-image as a reference and retaining parts of a same size at two sides of the center line, so that a center of the part corresponding to the first sub-image is used as a center of the stitched image after cutting; and
    outputting the stitched image to the irregular display screen for display,
    wherein resolutions of the wide-angle image and the non-wide-angle image are the same, and both of them are greater than a resolution of the irregular display screen.

2. The method according to claim 1, wherein the first edge sub-image and the second edge sub-image partially overlap with the first sub-image, respectively.

3. The method according to claim 1, wherein in response to determining that the aspect ratio of the stitched image does not suit the aspect ratio of the irregular display screen cutting the stitched image comprises:
    in response to determining that the aspect ratio of the stitched image is greater than the aspect ratio of the irregular display screen, only by cutting the stitched image in a width direction, causing the aspect ratio of the stitched image after cutting to suit the aspect ratio of the irregular display screen, and in response to determining that the aspect ratio of the stitched image is smaller than the aspect ratio of the irregular display screen, only by cutting the stitched image in a height direction, causing the aspect ratio of the stitched image after cutting to suit the aspect ratio of the irregular display screen.

4. The method according to claim 1, wherein the stitching is based on feature point matching.

5. A non-transitory computer-readable storage medium, the computer-readable storage medium having computer programs stored thereon which when executed by a processor perform a method of claim 1.

6. An in-vehicle system, comprising:
a wide-angle acquisition apparatus and a non-wide-angle acquisition apparatus, configured to:
    acquire a wide-angle image and a non-wide-angle image respectively at a same time, wherein the wide-angle acquisition apparatus and the non-wide-angle acquisition apparatus are located at a rearview mirror in a vehicle and are adjacent to each other on a same vertical line so as to be at a same photographing site, a view finding range of the wide-angle image including a view finding range of the non-wide-angle image, and an image part corresponding to the non-wide-angle image is located in the middle of the wide-angle image;
a processor, configured to:
    acquire the wide-angle image and the non-wide-angle image acquired by the wide-angle acquisition apparatus and the non-wide-angle acquisition apparatus,
    perform distortion correction on the acquired wide-angle image;
    perform image matching between the wide-angle image after distortion correction and the non-wide-angle image to identify a first sub-image in the wide-angle image corresponding to the non-wide-angle image;
    based on only the image matching between the wide-angle image and the non-wide-angle image, cutting out edge images from the wide-angle image along a direction of a longer of a width and a height of an irregular display screen, wherein the edge images includes a first edge sub-image and a second edge sub-image at two opposite sides of the first sub-image, the first edge sub-image and the second edge sub-image are entire edges at the two opposite sides of the first sub-image in the wide-angle image and the image matching is based on feature point matching,
    stitch the edge images and the non-wide-angle image to obtain a stitched image, wherein the first edge sub-image and the second edge sub-image are stitched to corresponding sides of the non-wide-angle image, respectively,
    determine whether an aspect ratio of the stitched image suits an aspect ratio of the irregular display screen,
    in response to determining that the aspect ratio of the stitched image suits the aspect ratio of the irregular display screen, directly output the stitched image to the irregular display screen for the irregular display screen; and
    in response to determining that the aspect ratio of the stitched image does not suit the aspect ratio of the irregular display screen, cut the stitched image, and output the stitched image after cutting, wherein the aspect ratio of the stitched image after cutting suits the aspect ratio of the irregular display screen, wherein cutting the stitched image comprises cutting edge parts of the stitched image by taking a center-line of a part corresponding to the first sub-image as a reference and retaining parts of a same size at two sides of the center line, so that the center of a part corresponding to the first sub-image is used as a center of the stitched image after cutting, and
    output the stitched image to the irregular display screen for display, wherein resolutions of the wide-angle image and the non-wide-angle image are the same, and both of them are greater than a resolution of the irregular display screen; and
the irregular display screen, configured to receive and display the stitched image output from the processor.

7. The in-vehicle system of claim 6, wherein the first edge sub-image and the second edge sub-image partially overlap with the first sub-image, respectively.

8. The in-vehicle system of claim 6, wherein the processor is further configured to, in response to determining that the aspect ratio of the stitched image does not suit the aspect ratio of the irregular display screen cut the stitched image, by performing the following operations:
    in response to determining that the aspect ratio of the stitched image is greater than the aspect ratio of the irregular display screen, only by cutting the stitched image in a width direction, causing the aspect ratio of the stitched image after cutting to suit the aspect ratio of the irregular display screen, and
    in response to determining that the aspect ratio of the stitched image is smaller than the aspect ratio of the irregular display screen, only by cutting the stitched image in a height direction, causing the aspect ratio of the stitched image after cutting to suit the aspect ratio of the irregular display screen.

* * * * *